and spread around at various spots where it is desired to repel the birds.

3,051,617
BIRD REPELLENT
Alma F. Mann, 826 N. 34th St., Milwaukee, Wis.
No Drawing. Filed Feb. 16, 1960, Ser. No. 8,905
4 Claims. (Cl. 167—46)

This application pertains to a formula or mixture to be used as a repellent for birds. It is a well-known fact that certain types of birds, including pigeons, usually congregate in flocks and roost on various homes and appendages on buildings. Obviously, this creates quite a nuisance, both from the noise standpoint and the change in appearance of the buildings due to the dropping and the like. In the past, various means have been utilized in an effort to keep these birds from roosting on buildings and the like by erecting scarecrows, using birds of prey such as owls, etc. but none of these methods have proved absolutely successful.

Therefore, there is a need for a simple bird repellent that will work and will keep birds away from the spots where the repellent is located.

It is therefore a primary object of my present invention to provide a bird repellent which may be utilized as a spray or may be mixed with sand or the like and spread about the desired places.

A salient feature of this invention resides in providing anise in some form with a vehicle or carrier and which anise, with the vehicle or carrier, acts to repel the birds and in particular, pigeons. The formula which has been found most effective consists of the following:

2 tablespoons whole anise seed, crushed and finely divided
1 cup of light weight oil (cooking oil or the like)
½ teaspoon oil of anise
½ ounce of pure anise extract (alcohol 73%, 29.6 cc. oil of anise, water)

The cup of light weight oil acts as a vehicle for the anise in the formula when the same is to be applied as a spray and also acts as a vehicle and carrier when the formula is to be poured into sand and to be absorbed by the sand. The type of oil is not important but I have found from experience that cooking oil is more desirable than other types of oil.

Obviously, the above formula is set forth merely to give the proper proportions and is usually mixed in a much greater quantity than listed above. Now, in order to repel the birds it is merely necessary to spray the above formula at the various places where the birds roost and they will not return to that spot. The odor of the anise and undoubtedly the taste acts to repel them and this formula has the further advantage of not being poisonous and therefore does not harm or kill the thirds. Further, as previously mentioned, this formula may be mixed with sand so as to be absorbed with the sand and the sand spread around at various spots where it is desired to repel the birds.

From the foregoing, it is believed that the features and advantages of my bird repellent should be readily apparent to those skilled in the art and it should be understood that certain minor changes in the proportions could obviously be resorted to without departing from the spirit of my invention or the scope of the appended claims.

What I claim as new is:

1. A bird repellent comprising whole anise seed, crushed and finely divided, and a carrier vehicle for the same.
2. A bird repellent including whole anise seed, crushed and finely divided, and light weight oil added thereto to act as a carrier vehicle for the same.
3. A bird repellent comprising whole anise seed, crushed and finely divided, oil of anise, pure anise extract, and a light weight oil acting as a vehicle for the above.
4. A bird repellent comprising the following ingredients in the following proportions:

2 tablespoons whole anise seed, crushed and finely divided
½ teaspoon oil of anise
½ ounce pure anise extract
1 cup light weight oil References Cited in the file of this patent

UNITED STATES PATENTS

| | | |
|---|---|---|
| 103,761 | Marsden | May 31, 1870 |
| 216,199 | Lukey | June 3, 1879 |
| 1,164,037 | Turkin | Dec. 14, 1915 |
| 1,366,509 | Thiessen | Jan. 25, 1921 |
| 1,507,029 | Prittie | Sept. 2, 1924 |
| 1,509,062 | Hoover | Sept. 16, 1924 |
| 1,971,910 | Griffifth | Aug. 28, 1934 |
| 1,997,083 | Robinson | Apr. 9, 1935 |
| 2,115,073 | Ingraham | Apr. 26, 1938 |
| 2,463,704 | Lloyd et al. | Mar. 8, 1949 |
| 2,504,788 | Baker | Apr. 18, 1950 |
| 2,571,867 | Hall et al. | Oct. 16, 1951 |
| 2,746,869 | Ellis | May 22, 1956 |
| 2,921,853 | Card et al. | Jan. 19, 1960 |
| 2,926,091 | Riddle | Feb. 23, 1960 |

FOREIGN PATENTS

| | | |
|---|---|---|
| 762,582 | Great Britain | Nov. 28, 1956 |

OTHER REFERENCES

Snyder et al.: J. Econ. Entomel., vol. 39, pp. 385–7 (1946), abstracted in Chem. Abstracts, vol. 40 (1946), #6206².

Spector: "Handbook of Biological Data," W. B. Saunders Co. (1956), Philadelphia, Pa., Repellents, pp. 412, 413, 432; Anise, pp. 42–43.

Lesser: "Animal Repellents," Soap and Sanitary Chemicals, pp. 123–7, 149–51, September 1949.